United States Patent [19]

Stinger

[11] 3,900,654
[45] Aug. 19, 1975

[54] COMPOSITE POLYMERIC ELECTRIC HEATING ELEMENT

[75] Inventor: Henry Joseph Stinger, Devon, Pa.

[73] Assignee: E. I. Du Pont de Nemours and Company, Wilmington, Del.

[22] Filed: Dec. 11, 1972

[21] Appl. No.: 314,021

Related U.S. Application Data

[63] Continuation-in-part of Ser. No. 162,870, July 15, 1971, abandoned which is a continuation-in-part of Ser. No. 60,551, Aug. 3, 1970, abandoned.

[52] U.S. Cl. ............... 428/214; 156/47; 219/528; 219/553; 428/220; 428/428
[51] Int. Cl. ... H05b 3/36; B32b 27/36; B32b 15/08
[58] Field of Search ........... 161/214, 189, 206, 216, 161/227, 165, 236; 219/553, 529, 528; 156/47, 309

[56] References Cited
UNITED STATES PATENTS

| 2,498,493 | 2/1950 | Hickernell | 174/126 |
|---|---|---|---|
| 2,643,206 | 1/1953 | Ford | 156/309 X |
| 2,688,070 | 8/1954 | Freedlander | 219/553 X |
| 2,892,747 | 12/1955 | Dye | 154/43 |
| 2,955,974 | 6/1959 | Allen | 154/128 |
| 3,325,344 | 6/1967 | Semancik | 161/218 |
| 3,385,959 | 5/1968 | Ames | 219/549 |
| 3,398,233 | 8/1968 | Lizasoain et al. | 338/210 X |
| 3,484,337 | 12/1969 | Starita | 161/216 X |
| 3,597,591 | 8/1971 | Derlip | 219/528 |
| 3,645,834 | 2/1972 | McCaffrey | 161/227 |

*Primary Examiner*—Harold Ansher

[57] ABSTRACT

A laminated composite polymeric structure having beneficial utility as an electric heating element which is thin, flexible, and durable as well as efficient and safe to use can be made by forming an assembly of layers in which a film of electrically insulating polymeric material is in contact with at least one side of a layer of electrically conductive elastomeric material made by mixing a fluoroelastomer with a conductive carbon black, and having a suitable conductor means such as a strip of copper or aluminum in contact therewith for connection to a power supply, and then heating and pressing the assembly until the conductive elastomeric layer has suitable conductivity and adhesion to the insulating film.

13 Claims, 1 Drawing Figure

PATENTED AUG 19 1975
3,900,654
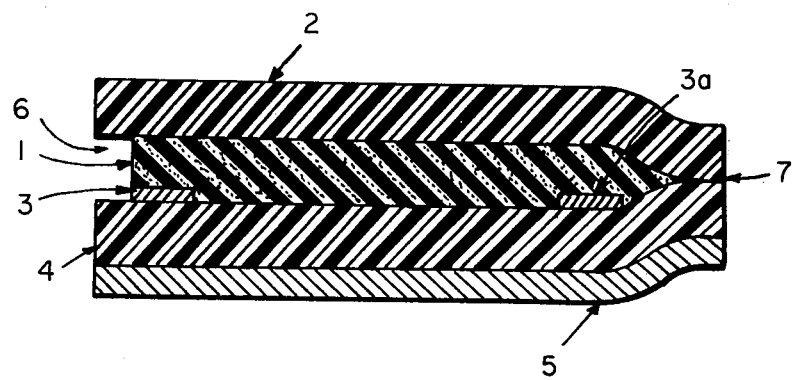

COMPOSITE POLYMERIC ELECTRIC HEATING ELEMENT

CROSS REFERENCE TO RELATED APPLICATIONS

This is a continuation-in-part of U.S. Pat. Application Ser. No. 162,870, filed July 15, 1971, now abandoned; Ser. No. 162,870 was a continuation-in-part of U.S. Pat. Application Ser. No. 60,551 filed on Aug. 3, 1970 (now abandoned).

BACKGROUND OF THE INVENTION

This invention relates to a process for manufacturing a composite polymeric electric heating element and to the resulting product. The invention especially concerns such an electric heating element in the form of a thin, flexible sheet or strip which can be used in the radiant heating of rooms and the like or as a contact heater for pipe lines, tanks, and other kinds of apparatus.

Some prior art electric heating elements available in sheet form lack the desired flexibility for certain applications. Others are too thick, or too easily damaged during installation and use, or have poor heating efficiency (either initially or after storage or use), or are unsafe to use under certain conditions, or cannot be made by an economical method. The industries which manufacture and use electric heating elements are in need of a production method and a product providing a solution to such problems as these.

SUMMARY OF THE INVENTION

Expressed broadly, the present invention provides a process for preparing a laminated structure useful as an electric heating element which comprises A. forming an assembly of layers in which a film of electrically insulating polymeric material is in superposed relation with a layer of electrically conductive elastomeric material containing electrically conductive carbon black dispersed in a fluorocarbon elastomer.

B. attaching to the assembly in contact with the conductive elastomer layer, a conductor means for electrically connecting the structure to an electric power supply, and C. pressing the assembly of layers at a pressure of at least 10 psi while the assembly is at a temperature of about 50°C. up to the highest temperature which will not damage any component of the assembly until the conductive elastomer layer of the resulting laminated structure has the desired electrical conductivity and the desired adhesion to the insulating film.

The invention also provides a laminated structure useful as an electric heating element which comprises 1. a layer of electrically conductive elastomeric material containing electrically conductive carbon black dispersed in a fluorocarbon elastomer, said layer having a specific resistivity of about 0.1–4 ohm centimeters, 2. a film of electrically insulating polymeric material in superposed adherent relation with layer (1), and 3. a conductor means in attached contact with layer (1) for electrically connecting the structure to an electric power supply.

BRIEF DESCRIPTION OF THE DRAWING

The single FIGURE of the drawing is an enlarged cross-sectional view of a preferred electric heating element made according to the present invention. This embodiment of the invention is described in detail below.

DESCRIPTION OF PREFERRED EMBODIMENTS

In an especially preferred embodiment of the present process, the assembly formed in Step (A) also contains a layer of the insulating polymeric film beneath the conductive elastomer layer; thus, the conductive elastomer layer is in interposed contact with the two insulating films. Both of the insulating films are selected from materials which will not undergo any harmful melting or other damage during the heating and pressing of the assembly. In most cases it is preferred to press the assembly under a pressure of about 25–3000 psi until the conductive elastomer layer of the resulting composite structure has a specific resistivity of about 0.1–4 ohm centimeters and is bonded to the two insulating films. In various preferred embodiments of the process, the conductive elastomer layer undergoes quite an unexpected improvement in conductivity (decrease in resistivity) during the hot pressing operation. For example, it is not uncommon to obtain a resistivity value in the product of about 20% of what it was prior to Step (C).

In the above broad description of the process, it is indicated that the asembly has an insulating film in superposed relation with the conductive elastomer layer. This expression, illustrating a typical arrangement, is used as a matter of convenience and brevity, enabling one to visualize that the layers are in face-to-face contact with each other just before and during the pressing operation; it does not mean that the film must be on top of the elastomer layer. In fact, the layers can be in a vertical position when using some types of assembly and pressing methods.

The insulating polymeric film is preferably a highly flexible, non-elastomeric durable plastic material which is impervious to the conductive elastomer composition during preparation of the product. A flexible polyester film is preferred in many applications, with special preference for a polyethylene terephthalate film on at least one side (preferably both sides) of the conductive elastomer layer. Also useful as the insulating film on one or both sides of the conductive elastomer layer are flexible insulating films of such materials as polyimides, fluorocarbon plastics (e.g. polyvinyl fluoride), polyethylene, polypropylene, and other known insulating polymeric materials.

The film can consist of a layer of the insulating polymer by itself, or the film can be composed of a layer of the polymer adhered to another material, for example a suitable fabric or other fibrous sheet material. The film of polymer can contain various additives known to be useful in insulating films of polymeric materials.

The fluorocarbon elastomer which is used in preparing the conductive elastomer layer is an elastomer that has excellent heat resistance. The elastomer can be mixed with various additives known to be useful in conductive elastomer compositions in addition to the carbon black component. A preferred type of fluorocarbon elastomer (fluoroelastomer) is an elastomeric copolymer of vinylidene fluoride and at least one other fluorine-containing monomer. The fluoroelastomer is preferably composed of at least one of the following: copolymers of vinylidene fluoride and hexafluoropropylene or pentafluoropropylene, copolymers of vinylidene fluoride, tetrafluoroethylene and hexafluoropropylene or pentafluoropropylene, and copolymers of vinylidene fluoride, hexafluoropropylene, and perfluoromethyl perfluorovinyl ether. Especially preferred are vinylidene fluoride/hexafluoropropylene copolymers in which the monomers are combined in a molar ratio of about 85:15 to 50:50. Also preferred is a copolymer of about 30–80 moles of vinylidene fluoride, 15–40 moles of hexafluoropropylene, and 5–30 moles of tetrafluoroethylene. Useful copolymers of vinylidene fluoride with a perfluoroalkyl perfluorovinyl ether are described in U.S. Pat. No. 3,136,745; and copolymers of vinlyidene fluoride, tetrafluoroethylene and said ether are described in U.S. Pat. No. 3,235,537. Useful copolymers of vinylidene fluoride and pentafluoropropylene are described in U.S. Pat. No. 3,331,823; and copolymers of these two components with tetrafluoroethylene are described in U.S. Pat. No. 3,335,106. The "other fluorinated monomer" of the fluoroelastomer is preferably an ethylenically unsaturated monomer containing at least as many fluorine atoms as carbon atoms.

In preparing the conductive elastomer layer, the elastomer is mixed with enough carbon black to give it the desired conductivity while retaining suitable strength and other necessary properties. It is usually mixed with about 10–100 parts of conductive carbon black per 100 parts of elastomer, about 35–100 parts of carbon black are often preferred. Acetylene black is used in many of the best embodiments of the invention. Most other types of carbon black tend to cause problems in preparing the elastomer layer or tend to make it difficult or impossible to obtain the desired product quality. However, results which are useful for some applications can also be obtained with other types of carbon black having high electrical conductivity, for example high structure furnace black.

During Step (A) of the process, a layer of the conductive elastomer composition can be roller coated on one or both of the insulating films to form all or part of the conductive elastomer layer. In this technique, the elastomer composition can be made up as a liquid coating composition in which the elastomer is dissolved or dispersed in an organic solvent that does not harm the insulating film, or is dispersed in water to form a latex. A solution coating method is especially preferred; and a gravure printing roll is a very useful part of the coating apparatus. The conductive elastomer layer can also be formed by spray-coating, extrusion, knife-coating, silk-screen coating, and other known methods of forming coatings, film, and the like from elastomer compositions.

I usually prefer to place the conductor means (e.g. a copper, brass, or aluminum conductor) between the two insulating films prior to Step (C), and to have at least a portion of the thickness of the conductive elastomer layer in interposed contact with at least one of the insulating films and the conductor means. Then, in Step (C) the conductor becomes bonded within the structure between the two insulating films. It is sometimes preferred to have a coat of adhesive applied to at least one side of the conductor prior to Step (C), for example, a conductive polyester adhesive composition. A preferred adhesive consists essentially of a mixture of a linear copolyester and electrically conductive carbon black; solvents, diluents and other known additives can be present if desired. The carbon black content of the adhesive can be similar to that of the conductive elastomer layer (e.g. about 10–100 parts per 100 parts of polymer). It is preferred to use a linear copolyester which is the product of reacting a polymethylene glycol of 2–6 carbon atoms with about 20–60 mol percent (based on the total amount of acids) of terephthalic acid, about 15–50 mol percent of isophthalic acid and about 10–65 mol percent of at least one compound selected from the group: suberic, azelaic, sebacic and adipic acids and derivatives thereof. Such copolyesters can be prepared by methods known in the art, for example as taught in U.S. Pat. Nos. 2,623,031, 2,623,033 and 2,892,747. It is also possible to place the conductor in attached contact with the conductive elastomer layer as required in Step (B) after carrying out the pressing operation of Step (C). One can use any known fastening method which provides the desired stength of attachment, electrical properties, production economy, and other required characteristics. Although a metallic conductor is usually preferred, one can also use a strip of highly conductive polymeric composition such as a mixture of a fluoroelastomer and acetylene black. The conductor means preferably runs the entire length of the product. One skilled in the art will be able to select the proper size, number, and spacing of the conductors to fit the requirements of the intended use of the product. In many cases it is convenient to use metal conductors having a thickness of about 0.5–4 mils (preferably about 1–2 mils) and a width of about ⅛–1 inch (preferably about ¼–½ inch).

In Step (C), the assembly of layers is preferably pressed for a period of about 0.1 second to 30 minutes while the assembly is at a temperature of about 100°–250°C. The heating of the layers to be bonded can be done before or during the pressing operation. I especially prefer to carry out the pressing by passing the assembly between at least one pair of heated pressure rolls, using a pressing period of about 0.1–3 fluorocarbon and a pressure on the assembly of about 15–2000 pounds per lineal inch of assembly width. Excellent results are often obtained with a pressing period of about 0.1–1 second. This illustrates the surprising speed at which the product can be made by the present process. The components can be fed in a continuous manner from storage rolls to a continuous pressing apparatus, and the product can be continuously passed from the press through a cooling zone and wound on storage rolls. Also, I often prefer to use a pressing temperature that is close to the highest temperature which will not damage (e.g. cause harmful decomposition) any component of the assembly, for example just below the decomposition temperature of the conductive elastomer layer or the insulating film, whichever is lower. This tends to give the best film-to-elastomer adhesion and the best conductivity values of the elastomer layer in the final product; it also tends to permit a rapid rate of production. It will be apparent that at least one of the pressure rolls can be covered with an adhesion resistant material (e.g. polytetrafluoroethylene), for example when pressing a structure having an insulating film on only one side of the conductive elastomer layer.

As specified above in the Summary of the Invention, and as indicated in the above description of the process, the laminated structure of this invention has as its three essential components (1) the conductive elastomer layer, (2) the insulating film bonded thereto, and (3) the conductor means attached to the conductive elastomer layer; further details on these components are given above.

Preferred embodiments of the product of this invention, some of which are already apparent from the above discussion, also have one or more of the following features: (1) As component 4 of the structure; there is an insulating film as defined for component 2 adhered to the other side of the component 1 conductive elastomer layer. This serves to reduce the hazard of electrical shock to a minimum, for example when a back side of a structure is not otherwise protected. (2) The fluorcarbon elastomer of component 1 is an elastomeric copolymer of vinylidene fluoride and at least one other fluorine-containing monomer. (3) Each insulating film has a thickness of about 0.5–15 mils; also, each film at least initially is impervious enough so that substantially none of the conductive elastomer material passes through it during manufacture of the product. (4) Conductor component 3 is bonded within the structure between film components 2 and 4. (5) A polyethylene terephthalate or other suitable known type of polyester film is used as component 2, and preferably also as component 4. (6) A polyimide film is used as one or both of the film components. (7) A polyethylene film is used as one or both of the film components. (8) A film of polyvinylfluoride or other suitable known type of fluorocarbon plastic is used as one or both of the film components. (9) The carbon black content of component 1 is about 10–100 parts, preferably about 35–100 parts, per 100 parts of elastomer. (10) Conductor component 3 is a metallic conductor, for example a strip or wire of copper, aluminum, or other highly conductive metal. (11) The carbon black of component 1 is acetylene black. (12) The product is capable of producing, at ordinary use temperature, about 10–60 watts of heat per square foot of the product (one square foot of product contains two square feet of heating area while each side of the product is free to function as a heater); also preferably at least 35 watts of heat per square foot at about 135°F. (13) The product has a temperature coefficient of electrical resistance of about 0–0.01 per °F, preferably about 0–0.003 per °F. (14) Conductive elastomer component 1 has a thickness of about 0.05–5 mils, preferably about 0.05–0.45 mil. (15) The adhesive which bonds the components of the structure together is the conductive elastomer layer; it is also possible, of course, to pretreat the insulating film by known methods to enhance adhesion. (16) The product is able to remain useful as a heating element after being bent to a radius of about ⅛ inch, and preferably after being repeatedly flexed and bent to such a small radius. (17) There is a layer of the conductive elastomer component in interposed adherence with one or both sides of component 3 and the nearest insulating film. (18) The conductive elastomer layer undergoes substantially no increase (e.g. about 0–5%) in specific resistivity when the product is stored under ordinary room conditions (e.g. 75°F., 50% relatively humidity) for at least 6 months. This test is normally started about 24 hours after making the product so as to give the structure a brief stabilization period. (19) At least one of the insulating films has an adherent coating of any suitable known heat reflective material, preferably on its exterior surface. This coating can be used to provide the structure with more efficient heat reflection and reduced flammability. Useful heat reflective materials include aluminum foil (which can be adhered to the surface), coating compositions containing a polymeric film-former and aluminum particles, and metals deposited by known vacuum evaporation methods. It will be apparent that this coating can be applied in a discontinuous pattern when one wishes to eliminate possible shock hazards or need for grounding the coating. (20) At least one of the insulating films has on its exterior surface an adherent coating of a heat absorbing material, for example a dark colored substantially nonreflective coat of a metallic or pigmented material which provides what is known in the art as a "black body radiator effect." This coat and the heat reflective coat can be applied by methods known in the art. (21) There is a layer of electrically conductive polyester adhesive in interposed adherent relation with a surface of the metallic conductor and the conductive elastomer layer; such an adhesive layer is preferably used in the manner illustrated in Example 4. (22) There is a layer of an adhesive consisting essentially of a copolyester in interposed adherent relation with a surface of the metallic conductor and an insulating film layer; this adhesive layer also is preferably used in the manner illustrated in Example 4. (23) Each copolyester adhesive layer present in the structure has a thickness of about 0.03–0.15 mil.

The embodiment of the product shown in the drawing is greatly enlarged in thickness to aid in viewing various components of the structure. Top insulating film 2 is in superposed adherent relation with conductive elastomer layer 1, and bottom insulating film 4 is in adherent relation with the lower surface of elastomer layer 1. The two conductor means 3 and 3a are made of copper strip; one is at the left edge of layer 1, and other is at the right edge; both are in bonded contact with layer 1 and contain means (not shown) suitable for electrically connecting the structure to an electric power supply. Both conductors are bonded within the structure between films 2 and 4. A portion of layer 1 is in interposed adherence between each conductor and film 2. Elastomer layer 1 is made from a mixture as described in Example 1 of fluorocarbon elastomer and acetylene black. Films 2 and 4 are made of polyethylene terephthalate. Other characteristics of the product, and the method used to prepare it, are about the same as given in Example 1.

Film 4 has an adherent coating 5 of a heat reflective material on its exterior surface. Open-edge 6 at the left side of the structure illustrates an edge in which the films 2 and 4 are not brought together and bonded or welded. Edge 7 at the right side illustrates an edge in which the films are bonded to each other, for example by means of any suitable known film welding or bonding method. The insulated type of edge is preferred for obvious reasons in many applications, for example where people are likely to come in contact with the edge of the product during use.

Laminated structures are obtainable according to the present invention which are very useful as electric heating elements. There are also other uses for the product, for example as resistor materials or other components of certain electronic devices; such uses will become apparent to those skilled in the art after reading the present disclosure. Products made in accordance with this invention can also be used as a spark plug lead material. The product can be made by fast and economical production methods (for example, by rapidly passing the assembled layers between heated rolls) within the novel process described above, and preferred embodiments of the product can readily be produced in qualities having a desirable combination of characteristics including low thickness, little or no flammability, high flexibility, durability and heating performance, and excellent retention of useful electrical properties including low resistivity during storage and use.

The beneficial utility of the preferred structures is illustrated as follows: They retain useful conductivity for a surprising length of time; they require no costly curing operation like certain prior art products; they permit the use of very thin and flexible elastomer layers and insulating layers; after they are fastened to a wall structure, sections are easily cut out and removed for placement of light fixtures and the like; and they are rapidly self-healing and thus have minimum shock hazard in areas where nails and the like are put through them. Sheets or strips of the composite structure can be easily installed in the walls, floors, or ceilings of rooms for use in heating the rooms, or they can be used in other space heating applications, or as contact heaters for pipe lines, tanks, and other kinds of apparatus. Preferred embodiments of the product are very resistant to damage by physical and chemical means during installation and use; and the product does not have to contain special supporting or reenforcing components (e.g. glass fabric) which are needed in certain prior art structures and which tend to make the product too costly, too thick, or too high in resistivity for certain applications. However, one can include glass fabric or the like in the present product for certain end uses if he wishes.

The voltage applied to the laminate of this invention when used as a heater will generally depend upon the voltage available at the point of use of the laminate. Particularly useful are 6 volt, 12 volt, 115 volt, 230 volt, and 480 volt power supplies. The 115 volt and 230 volt power supplies are usually preferred.

The temperature of operation of the laminate as a heating element will depend upon such factors as the film used as the insulating layer and the type of fluoroelastomer used in the conductive layer. When using a polyester film and a preferred type of electrically conductive fluoroelastomer layer, temperatures at least as high as about 150°C. can often be obtained.

About 50 watts/ft.$^2$ at 230 volts across a 2-foot width of a polyester film/conductive fluoroelastomer laminate is a typical heat value. This produces a surface radiation temperature, with substantially black body radiation, in the range of about 60° to 70°C. Other power levels and temperatures are attainable by varying, for example electrode placement, and thickness and composition of the elastomeric layer. Power levels in excess of 100 watts/ft.$^2$ at temperature up to 150°C. have been attained with polyester film/conductive fluoroelastomer laminates of the present invention.

The following examples illustrate the invention; all amounts are by weight unless otherwise indicated.

Example 1

An electrically conductive fluorocarbon elastomer composition of the following recipe is prepared in a ball mill.

| | Grams |
|---|---|
| Copolymer | 100 |
| Acetylene Black | 40 |

-Continued

| | |
|---|---|
| MgO | 15 |
| N,N'-dicinnamylidene-1, 6-hexane diamine | 3 |
| Acetone | 258 |
| Butyl Acetate | 297 |

The copolymer is a 60/40 weight percent copolymer of vinylidene fluoride and hexafluoropropene having a Mooney viscosity of 35 (ML-10 at 100°C.).

Methyl ethyl ketone was also added in an amount sufficient to give a mixture having fluidity suitable for gravure coating.

Two sheets of polyester (polyethylene terephthalate) film, 15 inches wide by 750 ft. long by 0.00094 in. thick, are each coated on one side with the elastomer composition using a reverse-roll gravure coating machine with a 10 ft. long forced air dryer. The film travels through the coating and drying apparatus at a speed of about 30 feet per minute. The temperature in the drying zone is about 230°F. The dry film thickness of the elastomer coating on each film is 0.3 mil (0.0003 inch).

Two copper electrodes, each 0.002 in. thick by 0.5 in. wide, are fed into the nip between 6 in. diameter smooth metal rolls of a 2-roll press; simultaneously, the two coated and dried sheets of film described above are fed to the rolls so that the electrodes are in interposed contact with the elastomer layers. The pressure on the assembly at the nip is about 150 psi, and the roll temperature is 175°C. The length of each roll is about 2 ft., and the lineal speed is about 30 ft./min. The assembly of coated sheets and copper electrodes leaves the press as a laminated composite sheet material.

Aluminum paint is sprayed on one side of the laminate and allowed to dry to form a heat-reflective coating (see item 5 of the drawing). The thickness of the paint is about 0.05 mil. The structure produced is similar in cross-section to the structure in the drawing except in the present product a portion of elastomer layer 1 is also beneath the electrodes (conductors) 3 and 3a.

The following electrical properties of the laminate, determined by using a Kelvin bridge, are observed:

| Specific Resistivity, ohm-cm. | | |
|---|---|---|
| Before Heating and Pressing | After Heating and Pressing | After 1000 hrs. of use at 160°F. |
| 3.5 | 0.7 | 0.63 |

The laminate is flexible and does not crack when wrapped 360° around a ⅛ in. diameter mandrel either before or after electrical testing. The laminate exhibits good adhesion of the conductive elastomer to the polyester film. Heat production (power dissipation) for this product at 230 volts is 140 watts per square foot of product at about 240°–245°F., and at 115 volts is 35 watts per square foot of product at about 130°–135°F. (surface temperature). The product has a temperature coefficient of electrical resistance of $0.7 \times 10^{-3}$ per °F. No further cure of the elastomer layer is carried out beyond the partial cure obtained during the drying and pressing operations.

EXAMPLE 2

An electrically conductive fluorocarbon elastomer composition is prepared in a ball mill according to the following recipe:

|  | Grams |
|---|---|
| Copolymer of Example 1 | 100 |
| Acetylene Black | 50 |
| MgO | 15 |
| N,N'-dicinnamylidene-1, 6-hexane diamine | 3 |

The elastomer composition is reduced with about 2800 g. of a 50/50 blend of acetone and butyl acetate. For each laminate, the reduced composition is spray coated on one side of each of two impervious layers of plastic film measuring 12 in. × 12 in. The type of film for each laminate is shown in Table I.

Two copper electrodes as described in Example 1 are placed between each set of coated and dried sheets to form an assembly in which the electrodes are in interposed contact with the conductive fluoroelastomer layers. Each assembly is hot pressed at 100°C. and 100 psi for 15 minutes in a standard shop flat-platen press to form a laminate. In the laminates made with the first three types of films of Table I, the fluoroelastomer layer has a total thickness of 2 mils; with the last type of film, the elastomer layer thickness is 3 mils.

Table I

| Film | Before Pressing | Specific Resistivity (ohm-cm) After Pressing | % Change |
|---|---|---|---|
| Polyethylene | 3.0 | 0.965 | 310 |
| (two 0.003" films) | 3.45 | 0.775 | 445 |
|  | 3.12 | 1.52 | 205 |
| Polyethylene | 2.68 | 0.615 | 435 |
| terephthalate | 2.5 | 0.615 | 405 |
| (two 0.005" films) | 2.72 | 0.55 | 495 |
| Polyvinyl fluoride | 3.0 | 0.835 | 360 |
| (two 0.001" films) | 3.0 | 0.715 | 420 |
|  | 3.04 | 0.70 | 435 |
| Polytetrafluoroethylene | 3.26 | 0.834 | 391 |
| (two 0.003" films) | 3.37 | 0.757 | 445 |
|  | 3.35 | 0.834 | 402 |

Each laminate is flexible and does not crack when wrapped 360° around a ⅛ in. diameter mandrel, and exhibits good adhesion of the conductive elastomer to the film.

EXAMPLE 3

A laminate of a conductive fluoroelastomer layer and polyester films is prepared in the manner described in Example 1 except (1) more acetone and butyl acetate and less methyl ethyl ketone is used in the elastomer composition; and a thicker layer is applied to the film as shown in (4) below; (2) the 2-roll press has 8 inch diameter rolls and the pressure on the assembly at the nip is about 500 psi; (3) the width of the assembly containing the conductive fluoroelastomer interlayer is 22 inches; (4) the fluoroelastomer layer has a total thickness of 0.9 mil in the product.

The product is capable of producing at least 35 watts of heat per square foot of heating area at a temperature of about 135°F.; it has a temperature coefficient of electrical resistance of $0.5 \times 10^{-3}$ per °F.; and its flexibility and layer-to-layer adhesion are good.

About 24 hours after the product is completed, it has a specific resistivity of 1.25 ohm-cm. After the product is stored for 18 months at 76°F. and 50% relative humidity, it has a specific resistivity of 1.18 ohm-cm. (slightly lower than 18 months earlier).

EXAMPLE 4

A laminated structure useful as an electric heating element is prepared by (1) making a conductive fluoroelastomer composition by thoroughly mixing the following in a ballmill: 126 parts of the vinylidene fluoride copolymer described in Example 1, 44 parts of acetylene black, 19 parts of magnesium oxide, 238 parts of acetone, 476 parts of butylacetate, 48 parts of butylalcohol, 121 parts of methylethylketone and 120 parts of methylisobutylketone; (2) making a copolyester adhesive composition by mixing 20 parts of a linear copolyester resin with 80 parts of a solvent for the resin composed of 50% toluene and 50% dioxane, said resin having been prepared in the manner described in U.S. Pat. No. 2,892,747, Example 1, by melt polymerizing a mixture of bis(ethylene glycol)esters of four acids in which the terephthalic acid content is 40 mol percent, the isophthalic acid content is 40 mol percent, the adipic acid content is 10 mol percent and the sebacic acid content is 10 mol percent;

(3) making a conductive polyester adhesive composition by thoroughly mixing the following in a ballmill: 150 ml. of an adhesive composition made in the manner described in Step (2), 6 grams of acetylene black, and 50 ml. of tetrahydrofuran;

(4) coating one side of a polyester film with the conductive fluoroelastomer composition resulting from Step (1) by providing a roll of poly(ethylene terephthalate) film (0.92 ml. thick, 24 inches wide), passing the film at a speed of 80 feet per minute through a Gravure coating machine so as to coat one side of the film with a layer of fluoroelastomer composition which will have a thickness when dried of 0.3 mil, passing the coated film through a forced air-drying tunnel in which the temperature is about 90°C. to dry the coating, and winding the coated polyester film on a storage roll;

(5) coating one side of another polyester film like the one used in Step (4) with the copolyester adhesive composition resulting from Step (2) in the manner described in Step (4) except for replacing the fluoroelastomer composition with the Step (2) copolyester composition, and reducing the coating thickness (when dry) to 0.05 mil;

(6) coating one side of an aluminum sheet with the conductive copolyester adhesive composition resulting from Step (3) in the manner described in Step (4) except for: replacing the fluoroelastomer composition with the Step (3) composition, replacing the polyester film with a roll of sheet aluminum (1 mil thick, 16 inches wide), reducing the coating thickness when dry to 0.05 mil, passing the coated sheet through a cutting machine which cuts it into 0.75 inch wide strips, and winding the coated strip material on storage rolls;

(7) continuously forming the laminate by simultaneously passing the coated materials resulting from Steps (4), (5) and (6) from the storage rolls at a speed of 80 feet per minute into the nip between the 8-inch diameter 3-foot long smooth metal rolls of a 2-roll press which applies a total pressure of about 7,000 pounds, only the top roll being heated (175° C.), the arrangement of the coated materials entering the nip being such that the laminated composite sheet material (laminate) leaving the nip has the following structure, which can readily be visualized by viewing the drawing: top film 2 is the film used in Step (4); conductive elastomer layer 1 is the coating applied to the film in Step (4); bottom film 4 is the film used in Step (5); on the top surface of the film 4 is the copolyester adhesive layer (not shown) applied in Step (5); the electrodes (aluminum strip conductors 3 near the left edge and 3a near the right edge) each has its bottom surface bonded and 3a near the right edge) each has its bottom surface bonded to film 4 by the adhesive applied in Step (5) and has its top surface bonded to conductive elastomer layer 1 by the conductive adhesive applied to the aluminum in Step (6); both edges of the product are sealed (see edge 7 in the drawing);

(8) passing the laminate from the nip of Step (7) over two water-cooled rolls and trimming the edges of the laminate to a final product width of 20 inches, and winding the laminate on a storage roll.

The product, which is very flexible and resistant to cracking, has a specific resistivity of 0.95 ohm-cm. and a resistance of 1240 ohms per square. Its heat production at 230 volts A.C. is 36 watts per linear foot; the distance between electrodes is 14.25 inches. The components of this thin and durable product are strongly bonded together. The product is surprisingly resistant to separation of the components during handling and storage, and during use as an electric heating element. The product has an unexpected retention of useful electrical properties during storage and use, plus various other beneficial properties of the type mentioned prior to the examples.

I claim:

1. A laminated structure useful as an electric heating element which comprises 1. a layer of electrically conductive elastomeric material containing electrically conductive carbon black dispersed in a fluorocarbon elastomer, said layer having a specific resistivity of about 0.1–4 ohm centimeters, said fluorocarbon elastomer being an elastomeric copolymer of vinylidene fluoride and at least one other fluorine-containing monomer, the conductive carbon black content of said layer being about 10–100 parts per 100 parts by weight of said elastomer, 2. a film of electrically insulating polymeric material in superposed adherent relation with layer (1), and 3. a conductor means in attached contact with layer (1) for electrically connecting the structure to an electric power supply.

2. A structure according to claim 1 wherein said conductive carbon black content is about 35–100 parts of acetylene black, the structure also contains (4) a film of electrically insulating polymeric material in adherent relation with the lower surface of layer (1), layer (1) has a thickness of about 0.05–5 mils, and the structure has the ability to produce about 10–60 watts of heat per square foot of product.

3. A structure according to claim 2 wherein layer (1) undergoes substantially no increase in specific resistivity when the structure is stored for a period of at least 6 months after it is made.

4. A structure according to claim 2 wherein the exterior surface of at least one of the insulating films has an adherent coating of a heat-absorbing material.

5. A structure according to claim 2 wherein each of the insulating films has a thickness of about 0.5–15 mils, and the conductor means is bonded within the structure between the two insulating films.

6. A structure according to claim 5 wherein at least one of the insulating films is a polyester film, and component (3) is a metallic conductor.

7. A structure according to claim 6 wherein layer (1) has a thickness of about 0.05–0.45 mil, and the structure has a temperature coefficient of electrical resistance of about 0–0.01 per degree F.

8. A structure according to claim 6 wherein layer (1) is the adhesive which holds the two insulating films together, and there is a layer of said conductive elastomeric material in interposed adherence between at least one side of component (3) and the nearest insulating film.

9. A structure according to claim 6 wherein the laminated structure is capable of remaining useful as a heating element after being bent to a radius of about ⅛ inch.

10. A structure according to claim 6 wherein there is a layer of electrically conductive polyester adhesive in interposed adherent relation with at least one surface of the metallic conductor and the adjacent layer of the structure, said adhesive consisting essentially of a mixture of conductive carbon black and a linear copolyester which is the product of reacting a polymethylene glycol of 2–6 carbon atoms with about 20–60 mol percent (based on the total amount of acids) of terephthalic acid, about 15–50 mol percent of isophthalic acid and about 10–65 mol percent of at least one compound selected from the group: suberic, azelaic, sebacic and adipic acids and derivatives thereof.

11. A structure according to claim 10 wherein there is a layer of polyester adhesive in interposed adherent relation with at least one of the insulating films and the conductive elastomer layer, said adhesive consisting essentially of the linear copolyester defined in claim 10.

12. A structure according to claim 11 wherein each of said adhesive layers has a thickness of about 0.03–0.15 mil.

13. A structure according to claim 11 wherein top and bottom insulating films 2 and 4 consist essentially of poly(ethylene terephthalate); conductor component 3 is at least one strip of metal in interposed adherent relation with elastomer layer 1 and bottom film 4; said conductive polyester adhesive layer is in interposed adherent relation with the top surface of conductor 3 and elastomer layer 1; and there is a layer of polyester adhesive in interposed adherent relation with the bottom surface of conductor 3 and bottom film 4, said adhesive consisting essentially of the linear copolyester defined in claim 10.

* * * * *